United States Patent [19]

Bayer et al.

[11] Patent Number: 4,813,795
[45] Date of Patent: Mar. 21, 1989

[54] HIGHLY LOADED CASE HARDENED RING

[75] Inventors: Oswald Bayer, Aidhausen; Martin Grehn, Dittelbrunn, both of Fed. Rep. of Germany

[73] Assignee: FAG Kugelfischer Georg Schafer (KGaA), Fed. Rep. of Germany

[21] Appl. No.: 209,990

[22] Filed: Jun. 22, 1988

[30] Foreign Application Priority Data

Jul. 22, 1987 [DE] Fed. Rep. of Germany ....... 3724168

[51] Int. Cl.$^4$ ............................................. F16C 33/58
[52] U.S. Cl. ..................................... 384/569; 384/492; 384/625
[58] Field of Search ............... 384/569, 492, 625, 571, 384/570, 548

[56] References Cited

U.S. PATENT DOCUMENTS

| | | | |
|---|---|---|---|
| 2,259,325 | 10/1941 | Robinson | 384/569 |
| 3,212,834 | 10/1965 | Mayer et al. | 384/492 |
| 3,275,389 | 9/1966 | Neilson et al. | 384/625 |
| 4,696,581 | 9/1987 | Tsushima et al. | 384/625 |

Primary Examiner—Lenard A. Footland
Attorney, Agent, or Firm—Ostrolenk, Faber, Gerb & Soffen

[57] ABSTRACT

The outer ring of the support roller mounted on an anti-friction bearing of a rolling mill has a soft core that is case hardened on its inner bore surface and on its outer peripheral surface, while not being case hardened at its axial end face sides, so that the outer ring will retain a cylindrical shape both for the inner bore surface, which rides on the rollers of the bearing, and the outer peripheral surface which supports the roll in a rolling mill.

3 Claims, 1 Drawing Sheet

U.S. Patent    Mar. 21, 1989    4,813,795 ial forces are arranged behind the rolls in the mill. -->

HIGHLY LOADED CASE HARDENED RING

BACKGROUND OF THE INVENTION

The present invention refers to a highly loaded bearing ring, particularly an outer ring of a roller bearing and specifically the outer ring of a support roller.

In order to prevent the sagging of rolls in rolling mills, a series of support rollers, which must transmit very high radial forces are arranged behind the rolls in the mill. Normally, these support rollers are in turn arranged via roller bearings on shafts that are fastened on the roll stand. Furthermore, due to the high load acting on the support rollers, they have outer rings of relatively large cross section. The outer rings serve at the same time as the supporting rollers. Because of the stresses applied to them, these outer rings are case hardened. As a result, a layer of hardness sufficient for resisting the stresses is produced over their entire circumference. On the other hand, the core of the outer ring remains soft, so that the danger of breakage of the outer ring is reduced.

These outer rings have been observed to plastically deform because of the high stresses, which in most cases occur at high temperatures. They deform in the manner that they develop a larger diameter in the axially central region, i.e., the ring is ovalized in axial cross section. As a result, the initially cylindrical bore surface, the roller raceway, also becomes concave, so that an uneven distribution of load results for the rollers at the places where the rollers contact the outer ring. The yield strength of the ring is exceeded locally, which produces cracks parallel to the axis on the edge of the raceway, and this may lead to breakage of the outer ring.

SUMMARY OF THE INVENTION

The object of the present invention is to improve the outer rings of support rollers in such a manner that the inner cylindrical bore surfaces and the outer peripheral surfaces are retained in cylindrical shape despite high loads and even after a lengthy period of operation.

Another object of the invention is to eliminate uneven load distribution for bearing rollers.

The outer ring of the support roller is hardened in a hardening process only at its inner or bore surface and at its outer peripheral surface. Instead of being hardened on its axial end face sides, it remains unhardened there. The core of the outer ring between the case hardened inner bore surface and the outer peripheral surface remains softer.

The object of the invention is achieved simply. It is merely necessary to avoid hardening of the axial face end sides of the ring by ordinary known means. In this way, development of a form stiffening hardness layer is avoided in these regions. Accordingly, even under very high load, the approximately cylindrical shape of the cylinder bore surface and outer peripheral surface are retained, which enables deformation to take place in the same manner at the soft edge regions as in the middle region. This occurs because there is no stiffening effect produced by the case hardened end face surfaces. Since the raceway now remains cylindrical, the rollers are also subjected to uniform load. The concentrations of stress and resulting cracks in the ring are avoided, and the operability of the entire support roller is substantially improved.

In accordance with a preferred embodiment, the unhardened end face sides of the outer ring are profiled, e.g., by having a groove defined in them, for receiving and supporting another object, such a sealing ring, holding disc, or the like. The profiles are produced in a simple manner in the soft metal of the end face seals. Frequently, the installation of these parts is also facilitated.

The unhardened profiled end face sides have the further advantage over correspondingly profiled but hardened face sides that they are less brittle and less notch-sensitive in this region and are therefore more stable.

BRIEF DESCRIPTION OF THE DRAWINGS

Other objects and features of the invention are explained with reference to the drawings, in which.

DETAILED DESCRIPTION OF THE PRIOR ART

Figure 1:
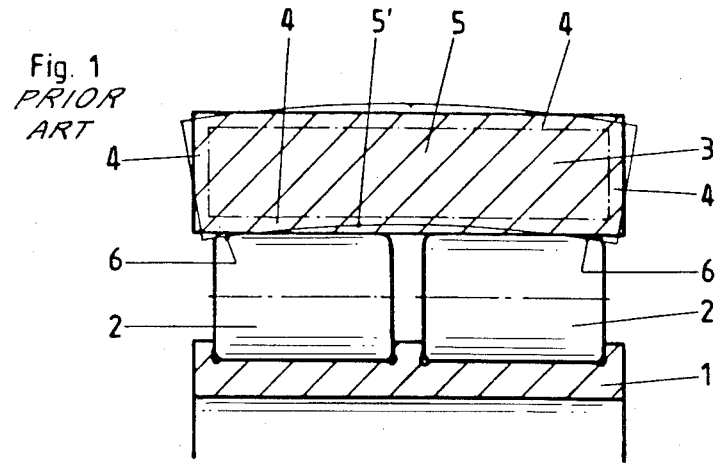
FIG. 1 shows the outer ring of a support roller of the prior art.

As can be noted in FIG. 1, support rollers of rolling mills comprise an inner ring 1, two rows of rollers 2, each row with a cage or separator (not shown), and an outer ring 3. In the prior art embodiment which is shown here, the outer ring 3 is case hardened and has hardened layers 4 of approximately the same thickness on all outer surfaces, namely the inner bore raceway surface, the outer peripheral surface and the axial end face surfaces. The internal core 5 of the ring 3 inside the outer surfaces remains soft.

Operating conditions for the support roller eventually deform the outer ring 5 into an oval shape in axial cross-section. As a result, the inner raceway 5' of the outer ring 3 also becomes concave and impermissibly high edge stresses occur in the outer ring, particularly in the region 6 of the outer face sides of the rollers 2. This leads to failure of the bearing.

DETAILED DESCRIPTION OF THE PREFERRED EMBODIMENT

Figure 2:
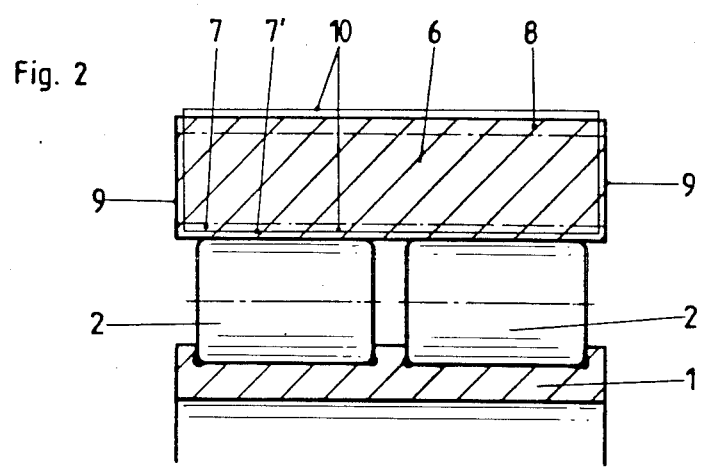
FIG. 2 shows an outer ring embodiment with a support roller according to the invention, having unprofiled or smooth end face sides.

In the embodiment of the invention of FIG. 2, the above defect experienced with the prior art is eliminated. Here the outer ring 6 is case hardened only in the region of the inner surface 7 which defines its bore and raceway 7, and of its outer surface 8, while the axial end face surfaces 9 remain unhardened. Under heating and load, this produces the cross-sectional shape 10 of the outer ring 6 which is indicated by thin lines.

The raceway 7' remains cylindrical. As a result, the desired uniform distribution of load over the rollers 2 and over the length of the outer ring is retained.

Figure 3:
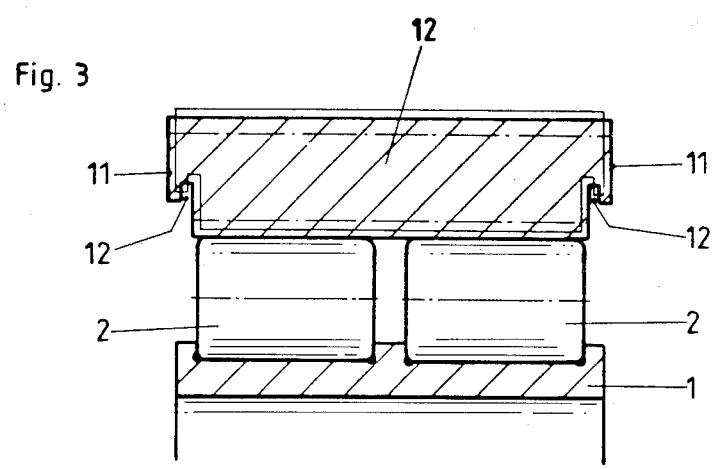
FIG. 3 shows an outer ring embodiment according to FIG. 2, with profiled end face sides.

FIG. 3 shows an embodiment which is similar to that shown in FIG. 2. But, differing from FIG. 2, in the embodiment of FIG. 3, the unhardened end face sides 11 of the outer ring 12 are each provided with a profile which has the shape of a radially inwardly opening groove 12'. Holding or sealing rings can be introduced into these easily produced grooves 12' and then are fastened there.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. An anti-friction bearing for a support roller, wherein the bearing comprises an inner ring, a row of rollers disposed around and rolling around the inner ring; and an outer ring outward of the row of rollers;

the outer ring having an inner bore surface rolling over the rollers;

the outer ring comprising a generally soft core, and surrounding the core are the inner bore surface, an outer peripheral surface outside the ring and axially opposite end face sides;

the inner bore surface and the outer peripheral surface being case hardened; the end face sides each being unhardened.

2. The bearing of claim 1, further comprising a profile defined in at least one of the end face sides of the outer ring and shaped for receiving therein another object.

3. The bearing of claim 1, wherein the inner bore surface is generally cylindrical in shape and the outer peripheral surface is generally cylindrical in shape.

* * * * *